United States Patent [19]

Kittag

[11] 4,092,062
[45] May 30, 1978

[54] SIGNAL DEVICE FOR ELECTRO-ACOUSTIC REPRODUCING EQUIPMENT

[75] Inventor: Gerd Kittag, Vienna, Austria

[73] Assignees: Karl Vockenhuber; Raimund Hauser, both of Vienna, Austria

[21] Appl. No.: 697,483

[22] Filed: Jun. 18, 1976

[30] Foreign Application Priority Data

Jun. 18, 1975 Austria ............................ 4689/75

[51] Int. Cl.² .............................................. G03B 1/60
[52] U.S. Cl. ..................................... 352/170; 352/4
[58] Field of Search ............... 352/22, 23, 24, 170, 352/171, 4

[56] References Cited

U.S. PATENT DOCUMENTS

| | | | |
|---|---|---|---|
| 2,725,785 | 12/1955 | Templin | 352/24 |
| 3,776,625 | 12/1973 | Fountain | 352/170 |

FOREIGN PATENT DOCUMENTS

| | | |
|---|---|---|
| 1,039,760 | 9/1958 | Germany. |
| 576,197 | 4/1945 | United Kingdom. |

*Primary Examiner*—Monroe H. Hayes
*Attorney, Agent, or Firm*—Fleit & Jacobson

[57] ABSTRACT

An audio signal device for reproduction apparatus such as a sound-film camera including a sound signal emitter and a microphone connected to the camera in which the control trigger on the camera is arranged through a switching arrangement to connect the sound emitter to the microphone only during at least one of the turn-on and turn-off steps in the operation of the camera to thereby provide an audible signal from the microphone to the person being photographed only during such steps.

3 Claims, 2 Drawing Figures

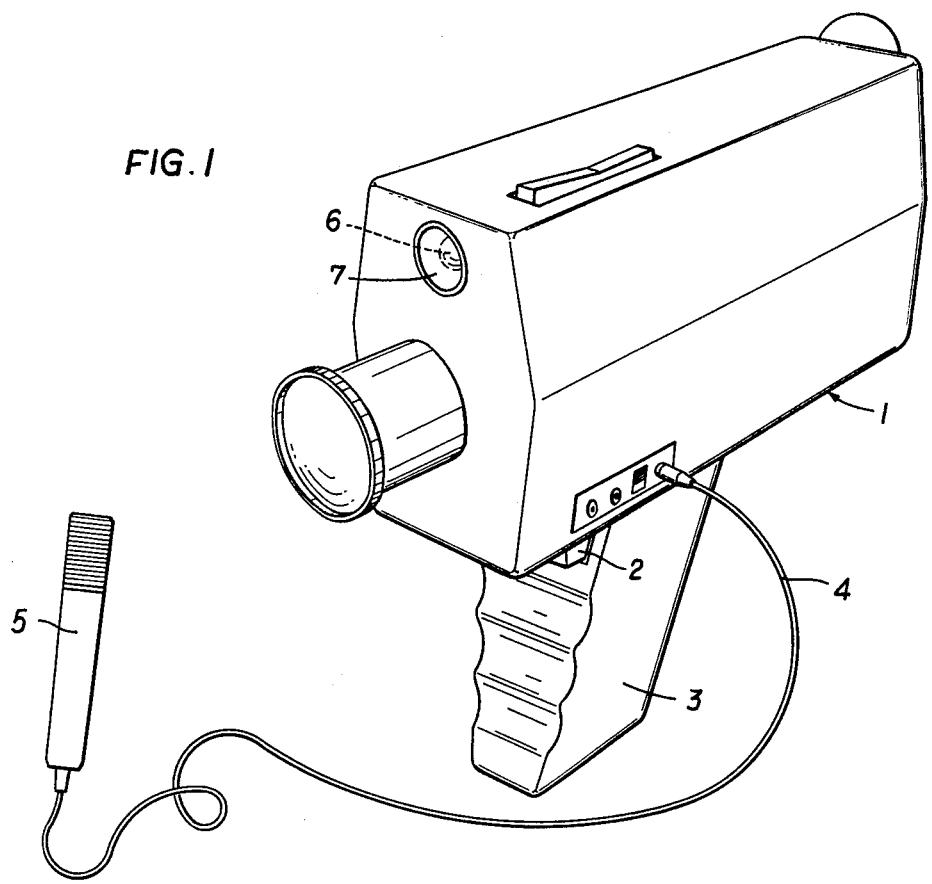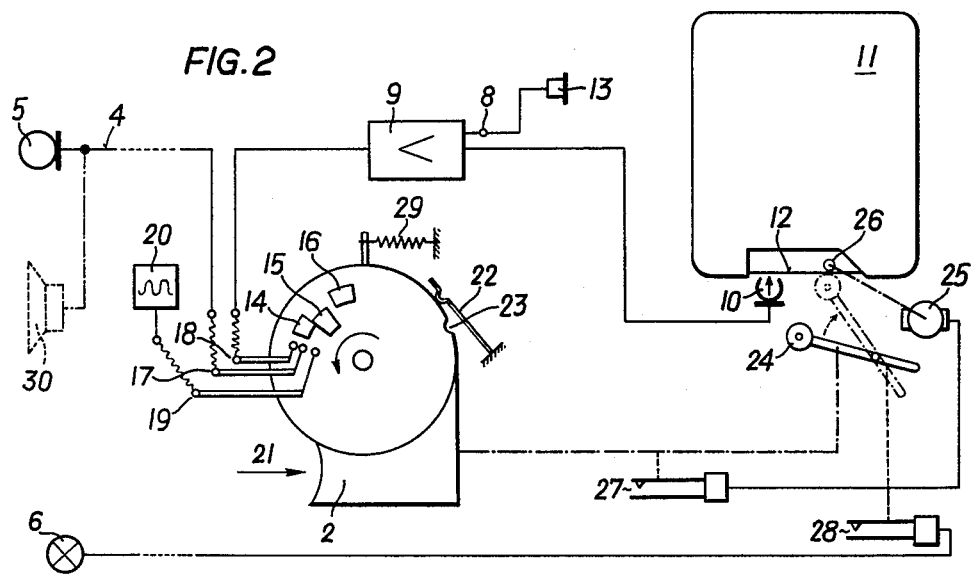

SIGNAL DEVICE FOR ELECTRO-ACOUSTIC REPRODUCING EQUIPMENT

The invention concerns a signal device for electro-acoustic reproducing equipment such as sound-film, magnetic tape, amplification equipment and the like in which a microphone or a similar device is connected to the input of such equipment and serves as an acoustic-/electrical signal converter.

BACKGROUND OF THE INVENTION

It is a known feature of acoustic reproducing equipment to use a signal light as an operation indicator which, for example, can be seen by a speaker or the like. It is also a known feature in the case of film or television cameras to utilize a light on the camera which is continuously illuminated when the camera is photographing. For this purpose, for example, a switch in the circuit of the signal light is closed by the trigger of the film camera. The arrangement of a signal light which indicates that the camera is in operation offers an actor the advantage that he is always aware that he is being filmed but it also has the disadvantage in that he must always watch the camera in order to see the signal light. When scenery is filmed, however, the reaction of the actor to the camera to observe this signal can be extremely disturbing. Furthermore, in strong sunlight, the signal flash is often difficult to see since its light emission, especially in amateur cameras is low in order not to overload the power supply of the camera.

In the case of film cameras, the use of acoustic signal devices which inform the cameraman as to the possible operational parameters of the camera is known. Thus, it has already been proposed to periodically send radiating sound signals to the cameraman during operation of the camera in order to determine the scene length. However, such a device cannot be used in sound-film cameras for synchronized taking of picture and sound information since they disturb the sound recording.

SUMMARY OF THE INVENTION

Basically, the invention is intended to provide a signal device so that an actor being filmed with a sound camera may know that the camera is in operation without having to look for the signal light.

Thus, according to the invention, in the case of a signal device of the type mentioned at the outset, it is proposed that an electronic sound signal emitter be provided which preferably can be activated only during the switch-on and /or switch-off phase of the equipment operation.

By means of this invention, a brief sound signal audible to the actor is emitted by the equipment during movement of the lever that switches the reproducing equipment on and off. The length of the acoustical signal should be selected such that its audibility begins, for example, with the movement of a sound-film camera trigger device and ends immediately before the start of the electronic sound transmission such as recording or the like. This assures that sound signals picked up by the microphone connected to the electro-acoustic reproducing equipment are not transmitted during reproduction.

When the recording of information is finished such as, for example, when releasing the sound-film camera trigger device, a sound signal is emitted again during the switch-off phase which informs the actor that the taking of the motion picture has ended.

According to a particularly advantageous embodiment of the invention, it is proposed to provide a microphone as an electro-acoustic converter connected to the electronic sound signal emitter. With this arrangement, the start and finish of the photographing operation can be clearly signaled even if the camera is a relatively long distance from the actor. Usually, a microphone which is to be spoken into is arranged near the sound source so that the signal sound can be clearly heard even in the case where loud background noises are present.

BRIEF DESCRIPTION OF THE DRAWINGS

An embodiment of the invention is shown as an example in the drawing in which

FIG. 1 is a perspective view of a sound-film camera with which the signal device of the invention is incorporated; and FIG. 2 is a schematic wiring diagram of the signal device of the invention incorporated in the camera of FIG. 1.

DESCRIPTION OF THE PREFERRED EMBODIMENT

Referring now to FIG. 1, there is shown an amateur sound-film camera 1, having a trigger device 2 mounted on a handle 3. A microphone 5 is connected by means of conductor 4 to the camera 1 for recording, for example, the conversation of the actors being photographed. When camera 1 is put into operation, a signal light 6 on the camera is switched on by the trigger device 2, the light 6 being arranged in the focal point of a reflector 7 on the front end of movie camera 1. A headphone (not shown) can be plugged into socket 8 in the camera housing, whereby the cameraman can hear the sound information picked up by microphone 5.

FIG. 2 shows schematically a block wiring diagram of the circuitry of the invention for emitting signal sounds which signal the starting and stopping of the camera 1 when actuated by trigger device 2 of the camera. For this purpose, microphone 5 is connected to the input of an electronic recording device 9 by means of conductor 4. The outlet of device 9 is connected with a recording head 10 which is associated with motion-picture film 12 provided in a cassette 11. Electronic recording device 9 essentially includes a sound signal voltage amplifier with automatic amplifier regulation and a high-frequency oscillator whose output signal is added to the amplified sound signal voltage. A headphone 13 is connected to the terminal 8 on the device 9 which the cameraman uses to control the sound signal.

Contact breaker points are arranged in the path of the microphone voltage applied to the input of electronic recording device 9. These contact breaker points consist of contacts 14, 15 and 16 which are arranged on a disc-shaped carrier made of insulation material that is disposed within the camera housing and which can be rotated by trigger device 2. Contact 14 serves as a contact bridge for both contact brushes 17, 18, contact 15 serves as a contact bridge for both contact brushes 17 and 19 and contact 16 serves as a contact bridge for both contact brushes 17, 18 as in the case of contact 14. Contact brush 17 is connected to the output of microphone 5, contact brush 18 is connected to the input of electronic recording device 9 and contact brush 19 is connected to the output of a sound signal generator 20.

The control of contacts 14–16 when actuating trigger device 2 will now be described. If, for example, movie shots are to be taken, microphone 5 must first of all be set up in the area of an actor. If trigger device 2 is then moved in the direction of arrow 21, the output signal of microphone 5 will be connected over contact 14 and contact brushes 17, 18 to the electronic recording device 9 thus furnishing a monitor control for the cameraman through headphone 13. As the carrier is rotated by the trigger device 2, the stop spring 22 readily engages stop groove 23 thereby holding trigger device 2 easily in this position. Simultaneously, when closing the circuit formed by elements 14 and 17, 18, a back-up roller 24 is moved toward film 12 into a ready position during the movement of trigger device 2 in the direction of arrow 21. A shaft 26, driven at constant speed by electric motor 25, is disposed on the side of movie film 12 opposite from that of roller 24. This motor 25 is switched on by means of switching contact 27 in the ready position of roller 24. This position of trigger device 2 is usually referred to as the "test-sound" position.

If the trigger device 2 is depressed further so that spring 22 is withdrawn from stop groove 23, the connection to the input of electronic device 9 is interrupted and the output of microphone 5 is connected to the output of sound signal generator 20 through contact 15. As a result, contact brush 19 conducts the output signal of generator 20 to contact 15 from which the output signal travels by means of contact brush 17 over conductor 4 to microphone 5. However, this contact 15 remains closed only for a short time or only until contact brushes 17, 18 are again connected by contact 16 so that the signal voltage emitted by microphone 5 is again conducted to the input of electronic recording device 9.

The time for movement of the trigger device 2 from the "test-sound" position into an operating position wherein contact 16 connects contact brushes 17, 18 conductively is sufficient to send a good audible sound signal to microphone 5. For this switching phase of trigger device 2, microphone 5 works as an electro/acoustic converter wherein the microphone converts the sound signal voltage into sound waves. This is shown in broken lines in FIG. 2 and designated by the numeral 30.

At the same time that trigger device 2 assumes an operating position, roller 24 is moved into its operating position against film 12 as shown by broken lines whereby film 12 is advanced and stores the sound signal voltages emitted by microphone 5. Contact 28, which is provided for turning on signal light 6, is actuated in the operating position of roller 24.

The sound of the acoustic signal tells the actor that he is being photographed by the camera. In a given situation, he can also check the operational state of the camera later by the illuminating of signal light 6.

If trigger device 2 is released for movement in the opposite direction from the arrow 21, it will be brought back to its original position by the force of a spring 29 so that an acoustic signal sound is again emitted briefly by means of contact 15. As trigger device 2 reaches its original position, all of the contacts (contact brushes, contacts) are inactivated.

As seen in FIG. 2, contact 15 is separated from contact 16 by a narrow insulating insert. In a given situation, this separation may be necessary as a precaution for preventing signals emitted by signal generator 20 from disturbing the recording of the sound information. This also prevents vibrations of the microphone membrane or the like caused by the signal sound from influencing the recording of the sound information directly after turning off the signal generator 20.

Furthermore, it is conceivable to provide a delay in the action of turning on the equipment in order to produce a longer sound signal during this phase. This delay can be achieved by a mechanical retarding mechanism or by an electrical time circuit.

The invention has been described with reference to a sound film camera. Basically, this type of signal, knowing the particular operating conditions of the particular equipment, may also be used for magnetic tape equipment, sound projectors, amplifiers and the like. Furthermore, a sound converter 30 may be arranged in the equipment itself or a mechanical sound transmitter such as a buzzer or the like can be used. Fundamentally, it is also possible to switch in only direct current through the contacts which are provided for controlling the semiconductor switching mechanisms that are hooked into the signal voltage circuits. These semiconductors may be in the simple form of switching diodes. In order to provide a clear differentiation between the turn-on and turn-off signals, it is advisable to provide different frequencies and/or amplitudes for each.

I claim:

1. Apparatus for use with a recording device of the type employing a microphone and an amplifier for signalling the commencement and cessation of a recording operation, comprising: signal generating means, transducer means for converting said signal into an audible sound, and switch means connected to said microphone, said amplifier, said signal generating means, and said transducer means, said switch means having an off position and being sequentially operable from said off position into a first position corresponding to the commencement of the recording operation wherein said signal generating means is connected to said transducer means, into a second position corresponding to the recording operation wherein said microphone is connected to said amplifier, into a third position corresponding to the cessation of the recording operation wherein said signal generating means is connected to said transducer means, and into said off position.

2. The apparatus of claim 1 further comprising an earphone connected to said amplifier and wherein said switch means comprises an additional position located between said off position and said first position corresponding to a monitoring operation wherein said microphone, said amplifier and said earphone are operably interconnected.

3. The apparatus of claim 1 wherein said microphone comprises said transducer means.

* * * * *